United States Patent
Wheeler et al.

(10) Patent No.: US 7,257,900 B2
(45) Date of Patent: Aug. 21, 2007

(54) CANTED SAW BLADE

(75) Inventors: Thomas J. Wheeler, Pomona, CA (US); Nicholas E. Achterberg, Trappe, MD (US); Thomas M. Gaffney, Lutz, FL (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/038,327

(22) Filed: Jan. 2, 2002

(65) Prior Publication Data

US 2003/0121388 A1 Jul. 3, 2003

(51) Int. Cl.
*B23D 51/10* (2006.01)
*B23D 61/12* (2006.01)
*B27B 19/02* (2006.01)

(52) U.S. Cl. .............. 30/392; 30/339; 30/351; 83/697; 83/699.21; 83/835; 279/77

(58) Field of Classification Search .......... 30/337, 30/338, 339, 351, 392, 393, 394; 83/697, 83/699.21, 835; 279/76–80
See application file for complete search history.

(56) References Cited

U.S. PATENT DOCUMENTS

| | | | | |
|---|---|---|---|---|
| 2,866,485 A | | 12/1958 | Anton ................... | 30/374 |
| 2,987,086 A | * | 6/1961 | Westlund, Jr. .......... | 83/835 |
| 3,028,890 A | | 4/1962 | Atkinson et al. ........ | 30/375 |
| 3,033,251 A | | 5/1962 | Atkinson et al. ........ | 83/835 |
| 3,802,079 A | | 4/1974 | Ketchpel, Jr. et al. .... | 30/376 |
| 3,977,287 A | * | 8/1976 | Beale .................. | 83/697 |
| 4,083,112 A | | 4/1978 | Palm .................. | 30/335 |
| 4,204,692 A | | 5/1980 | Hoffman ............... | 279/81 |
| 4,299,402 A | | 11/1981 | Hoffman ............... | 279/75 |
| 4,528,753 A | * | 7/1985 | Kuhlmann et al. ....... | 30/392 |
| 4,739,557 A | | 4/1988 | Wagner ................ | 30/392 |
| 5,103,565 A | * | 4/1992 | Holzer, Jr. ............ | 30/392 |
| 5,306,025 A | * | 4/1994 | Langhoff .............. | 30/392 X |
| 5,322,302 A | | 6/1994 | Quirijnen ............. | 279/22 |
| 5,324,052 A | * | 6/1994 | Ortmann .............. | 30/392 X |
| 5,433,457 A | * | 7/1995 | Wright ............... | 30/392 X |
| 5,443,276 A | | 8/1995 | Nasser et al. ......... | 279/77 |
| 5,575,071 A | | 11/1996 | Phillips et al. ........ | 30/392 |
| 5,647,133 A | | 7/1997 | Dassoulas ............ | 30/392 |
| 5,664,792 A | * | 9/1997 | Tseng ................ | 30/339 X |
| 5,697,279 A | * | 12/1997 | Schnizler et al. ...... | 83/698.31 |
| 5,794,352 A | | 8/1998 | Dassoulas ............ | 30/392 |
| 5,810,367 A | | 9/1998 | Holzer, Jr. et al. ..... | 279/102 |
| 5,903,983 A | | 5/1999 | Jungmann et al. ...... | 30/392 |

(Continued)

FOREIGN PATENT DOCUMENTS

DE  3706429 A1  9/1988

(Continued)

*Primary Examiner*—Clark F. Dexter
(74) *Attorney, Agent, or Firm*—Harness, Dickey & Pierce, P.L.C.

(57) ABSTRACT

A saw blade incorporates an integrated cant angle. The saw blade includes a cutting portion having a toothed edge and opposite edge. The toothed edge defines a cutting plane. A shank portion extends from the cutting portion and is laterally offset from the opposite edge of the cutting portion defining a step thereat. The shank includes an end portion including a mounting edge, the mounting edge and step define a mounting plane which is angularly offset from the cutting plane.

15 Claims, 5 Drawing Sheets

U.S. PATENT DOCUMENTS

| | | | |
|---|---|---|---|
| 6,023,848 A | 2/2000 | Dassoulas et al. | 30/392 |
| 6,112,420 A | 9/2000 | Schickerling | 30/392 |
| 6,302,406 B1 * | 10/2001 | Ventura | 279/48 |
| 6,357,123 B1 * | 3/2002 | Manuel | 30/374 |
| 6,625,892 B2 * | 9/2003 | Takahashi et al. | 30/393 |

FOREIGN PATENT DOCUMENTS

| | | |
|---|---|---|
| DE | 3912227 A1 | 10/1989 |
| DE | 19501019 A1 | 7/1996 |
| DE | 29720605 U1 | 5/1999 |
| DE | 19947840 A1 | 4/2000 |
| DE | 10000982 A1 | 9/2000 |
| DE | 20013789 U1 | 1/2001 |
| GB | 1597240 | 9/1981 |
| GB | 2173734 A | 10/1986 |
| WO | WO95/27583 | 10/1995 |
| WO | WO00/21707 | 4/2000 |

* cited by examiner

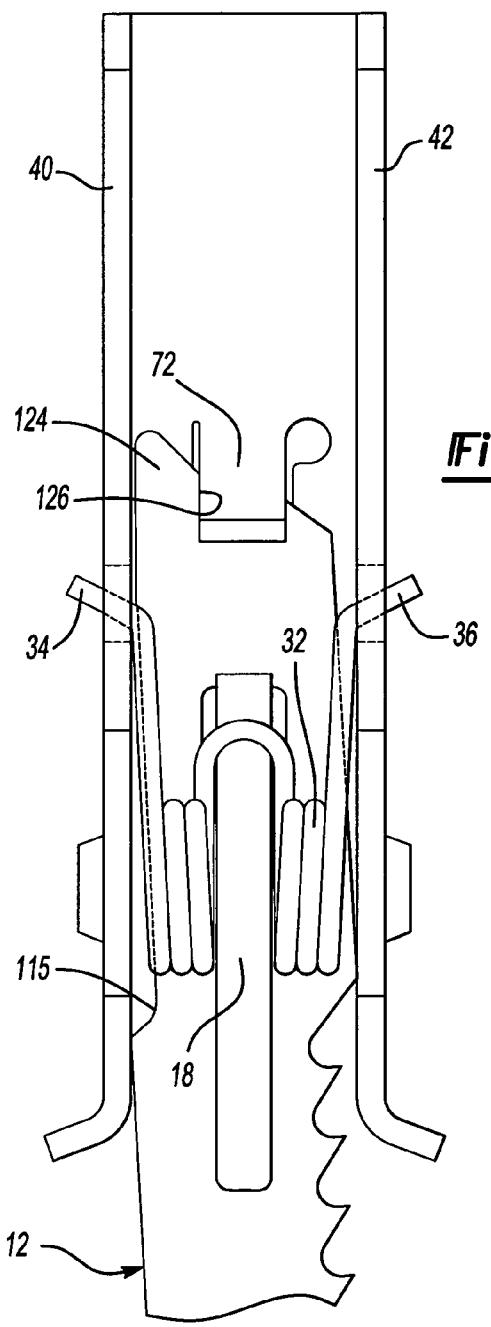
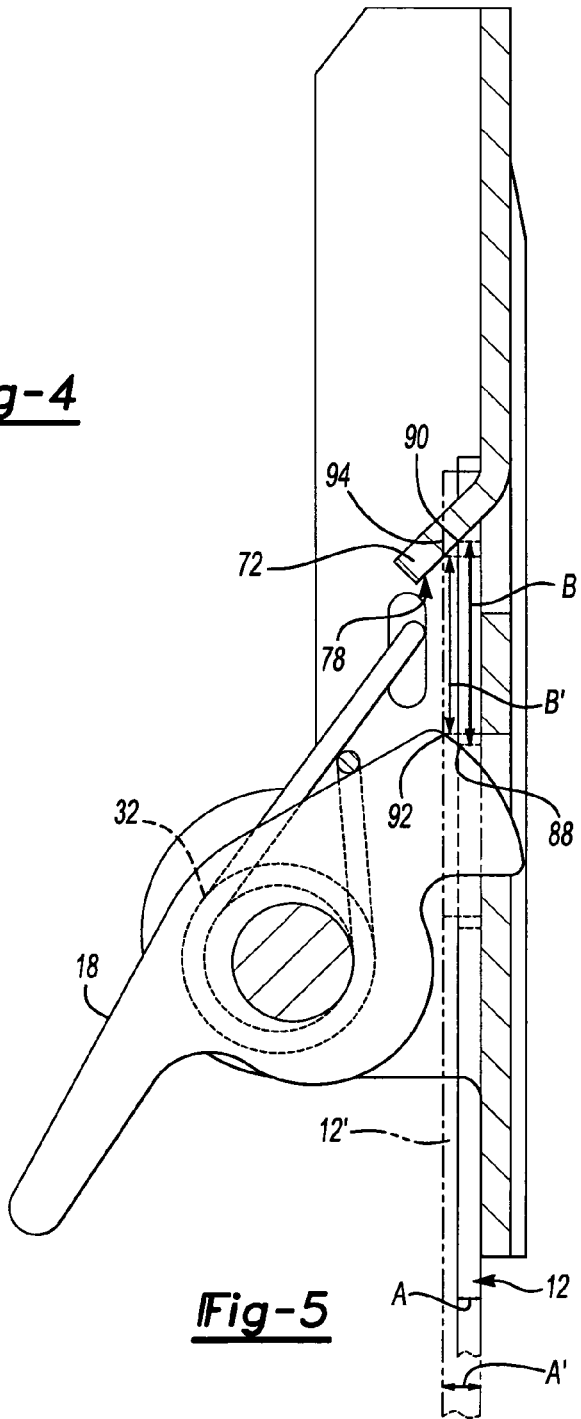
Fig-4
Fig-5

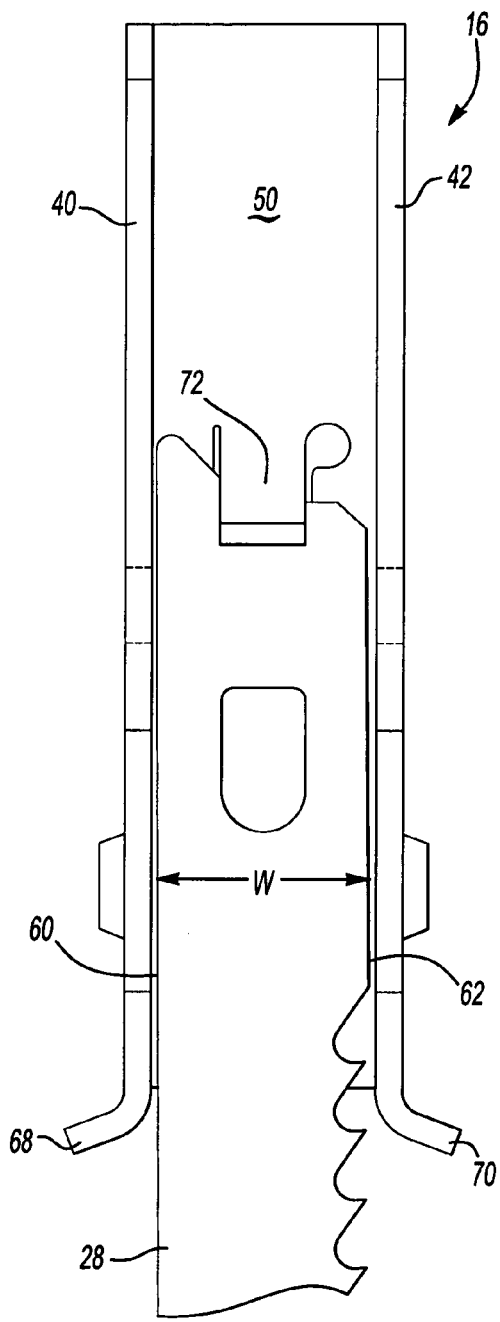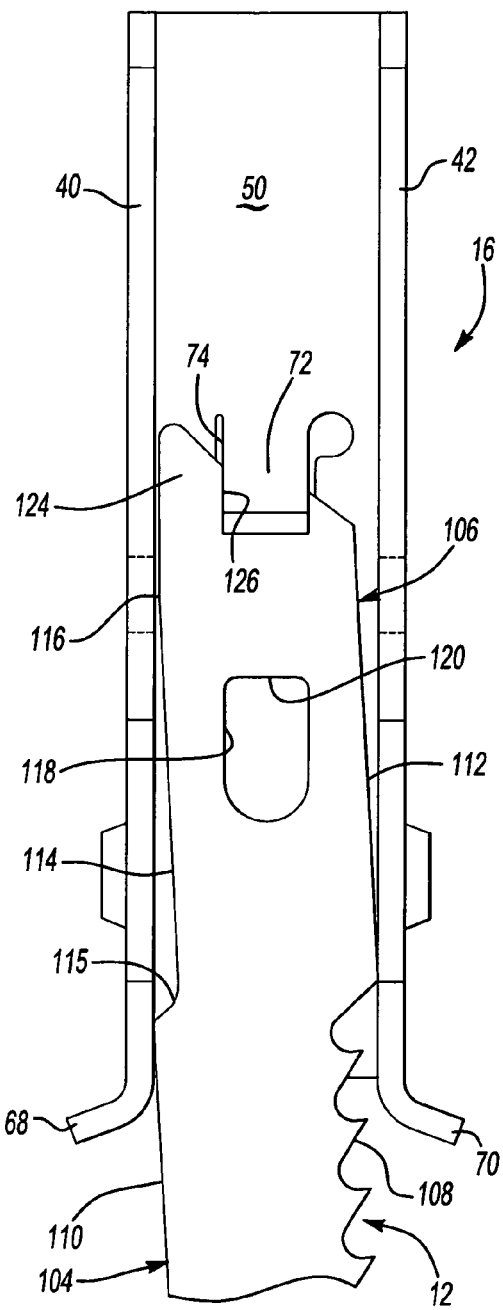

CANTED SAW BLADE

FIELD OF THE INVENTION

The present invention relates generally to saw blades, and more particularly to a saw blade having an integrated cant angle.

BACKGROUND

A reciprocating saw blade may include features that provide increased cutting speed. For example, hook angle, kerf, teeth per inch and cant-angle may be adjusted to allow faster cutting time. The first three features allow a certain variation without incurring additional manufacturing costs. However, to include a non-zero cant angle, additional processing steps or process types must be used.

For example, a first conventional design includes a canted blade including a toothed edge tapering toward the shank end. Such a design provides a blade having a reduced cross sectional area near the shank end resulting in reduced blade strength. In addition, higher cant angles are not easily achieved due to the length of the blade.

A second conventional design includes a canted blade including a shank extending at a predetermined angle toward the toothed edge. This design must allow for increased material width to accommodate the shank. Such an arrangement can require 10-15% wider material strip which drives up cost.

It is therefore desirable to provide a positive canted blade while maintaining methods and raw-material strip-widths that apply to zero-canted blades.

SUMMARY OF THE INVENTION

It is a general object of the present invention to provide a positive canted saw blade while maintaining manufacturing methods and raw-material strip-widths that apply to zero-canted blades.

In one form, the present invention provides a saw blade including a cutting portion having a toothed edge and an opposite edge. The toothed edge defines a cutting plane. A shank portion is attached to and laterally offset from the opposite edge defining a step thereat. The shank includes an end portion including a mounting edge, the mounting edge and step define a mounting plane which is angularly offset from the cutting plane.

In another form, the present invention provides a support structure including a pair of lateral walls and a base portion extending between the pair of lateral walls. A saw blade includes a cutting portion having a toothed edge and an opposite edge. The toothed edge defines a cutting plane. A shank is attached to and laterally offset from the opposite edge defining a step thereat. The shank includes an end portion having a mounting edge. The mounting edge and the step define a mounting plane which is angularly offset from the cutting plane. The saw blade is insertable between the pair of lateral walls whereby the mounting plane abuts one of the lateral walls.

In yet another form, the present invention provides a saw blade having a cutting portion including a toothed edge defining a first plane and an opposite edge defining a second plane, the second plane substantially parallel to the first plane. The saw blade further includes a shank portion having a first edge substantially coplanar to the first plane and a second edge defining a third plane, the third plane angularly offset from the second plane.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a plan view of the saw blade retaining mechanism.

FIG. 5 is a side view of the saw blade retaining mechanism taken along line 5-5 of FIG. 4 shown operatively retaining a first or second saw blade having different thicknesses.

FIG. 6 is a plan view of the saw blade retaining mechanism shown with the clamp system removed and a n on canted blade positioned therein.

FIG. 7 is a plan view of the saw blade retaining mechanism shown with the clamp system removed and a canted blade positioned therein.

DETAILED DESCRIPTION OF THE PREFERRED EMBODIMENTS

Figure 1:
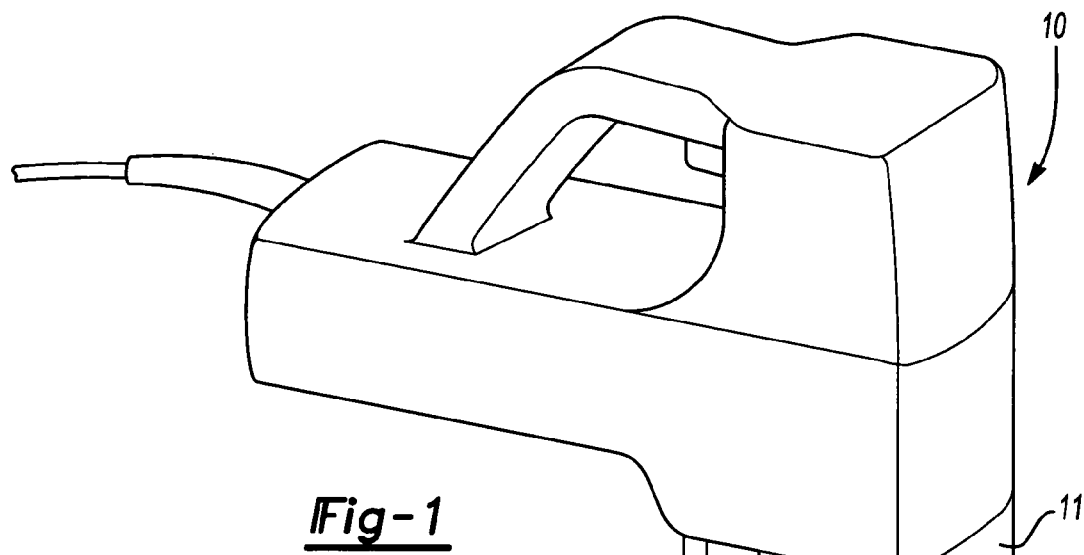
FIG. 1 is an environmental view of the saw blade retaining mechanism shown in a jig saw.

With initial reference to the perspective view of FIG. 1, a retaining mechanism or clamp device 20 according to the teachings of the present invention is illustrated within a housing 11. The housing 11 includes push button 8 which is operable to disengage the clamp device 20. The clamp device 20 is shown operatively interconnected to a conventional jig saw 10 and is configured to securely retain a plurality of saw blades having a variety of thicknesses. For example, as shown in FIG. 5, the clamp device 20 is configured to securely retain a first or second blade 12, 12' with different thicknesses.

For exemplary purposes, blades 12 and 12' are provided in the illustrations. Blade 12 has a thickness A of 0.035 inches (0.89 mm) and blade 12' has a thickness A' of 0.05 inches (1.27 mm). Blades 12 and 12' generally fit the "thin" and "thick" blade categories respectively.

Figure 2:
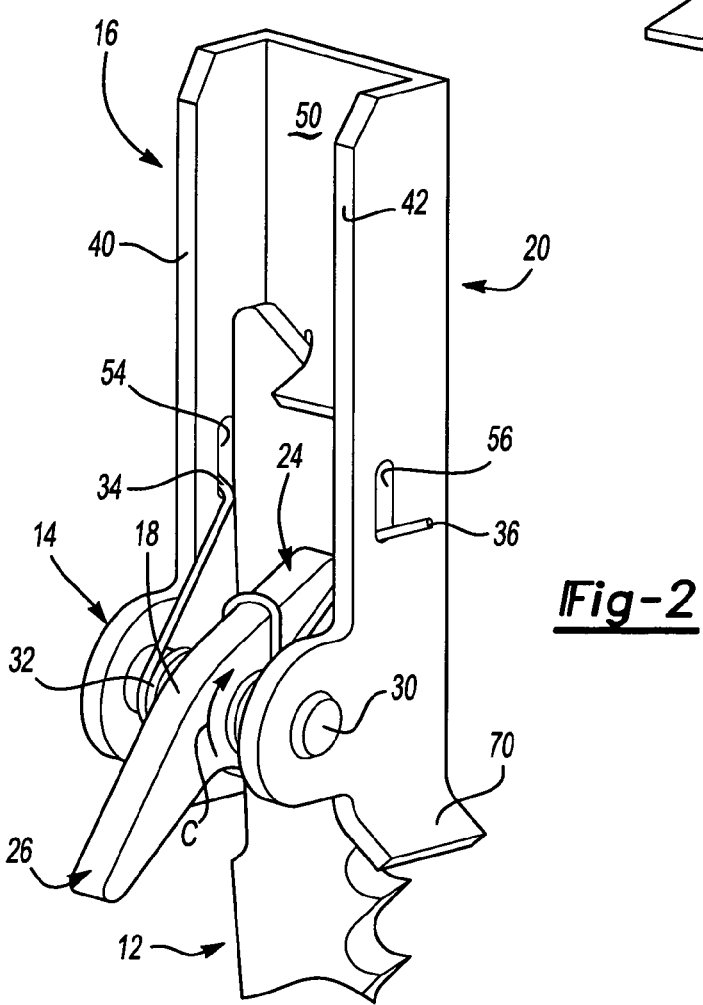
FIG. 2 is a perspective view of the saw blade retaining mechanism.
Figure 3:
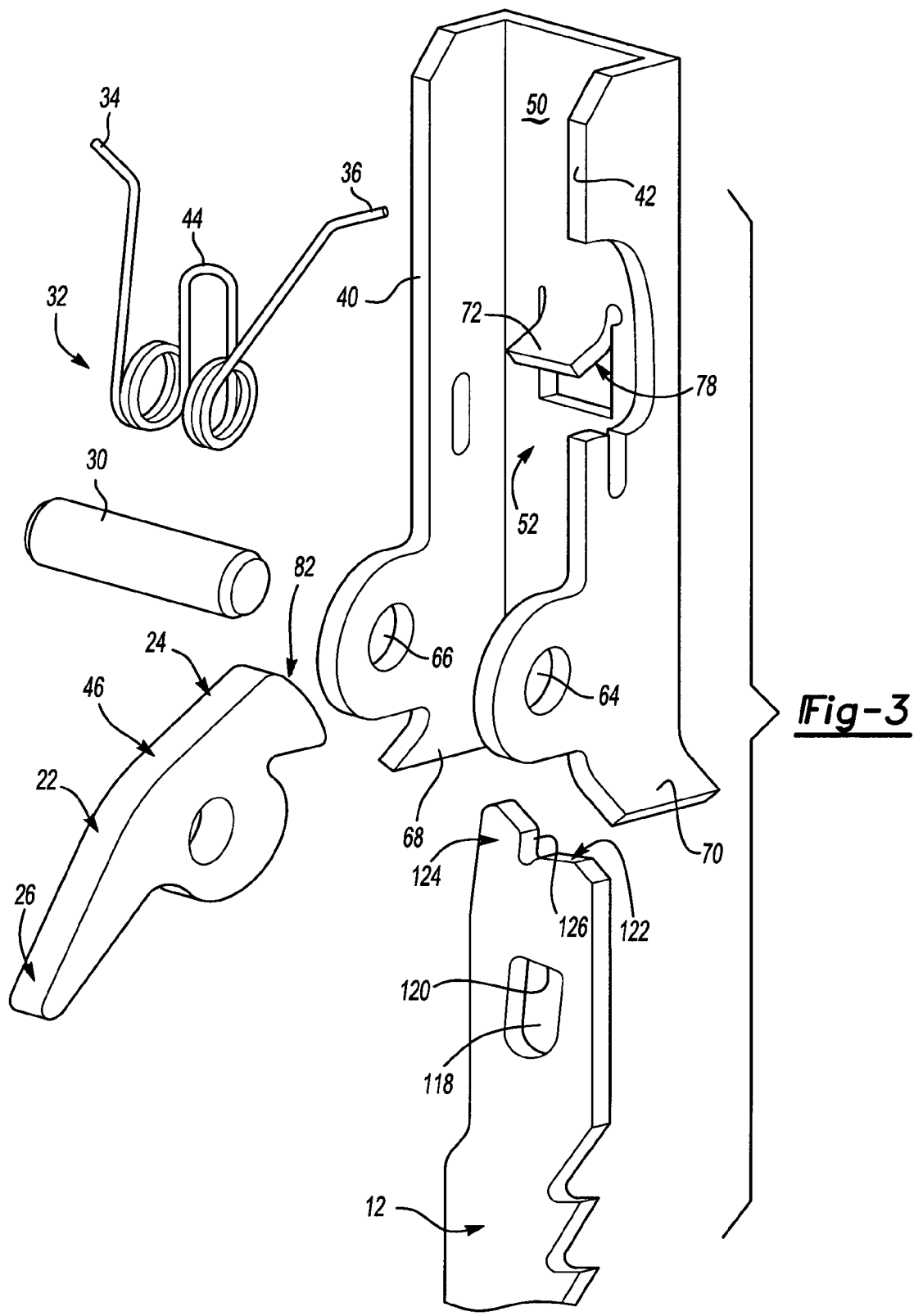
FIG. 3 is an exploded perspective view of the saw blade retaining mechanism.

With continued reference to FIG. 1, and additional reference to FIGS. 2 and 3 wherein the housing 11 and push button 8 have been removed for illustrative purposes, the retaining mechanism 20 generally includes a cam system 14 and base 16. The cam system 14 includes a rocker arm 18 having a lever end 26, an intermediate pivot portion 22 and a clamp end 24. The intermediate pivot portion 22 is adapted to receive a support shaft 30 therethrough for rotational movement thereabout. The lever end 26 is activated by the push button 8 mounted on the housing 11, shown in FIG. 1.

Rocker arm 18 is biased in a clockwise direction (arrow C) such that the clamp end 24 is influenced against the saw blade 12. Spring 32 includes a first and second end 34, 36 fixedly attached to a first and second side wall 40, 42 of base 16. An intermediate loop 44 of the spring 32 is adapted to communicate with an upper surface 46 of the rocker arm 18 to provide a biasing force thereat.

With particular reference to FIGS. 2 and 3, the base 16 includes a floor 50 having first and second side walls 40, 42 extending perpendicularly therefrom defining a channel 52. The first and second side walls 40, 42 include first and second spring mounting passages 54, 56 for fixedly securing the spring ends 34, 36 therethrough. Similarly, support shaft 30 is retained through apertures 64, 66 disposed in walls 40, 42 respectively. A majority of first and second walls 40, 42 are generally parallel to one another. The ends of first and second side walls 40, 42 are contoured outwardly creating first and second guide flanges 68, 70. The guides 68, 70 serve to help direct the blade 12 into the channel 52. The floor 50 of the base 16 includes a stop 72. Stop 72 is oriented at an angle toward the cam system 14.

Figure 8:
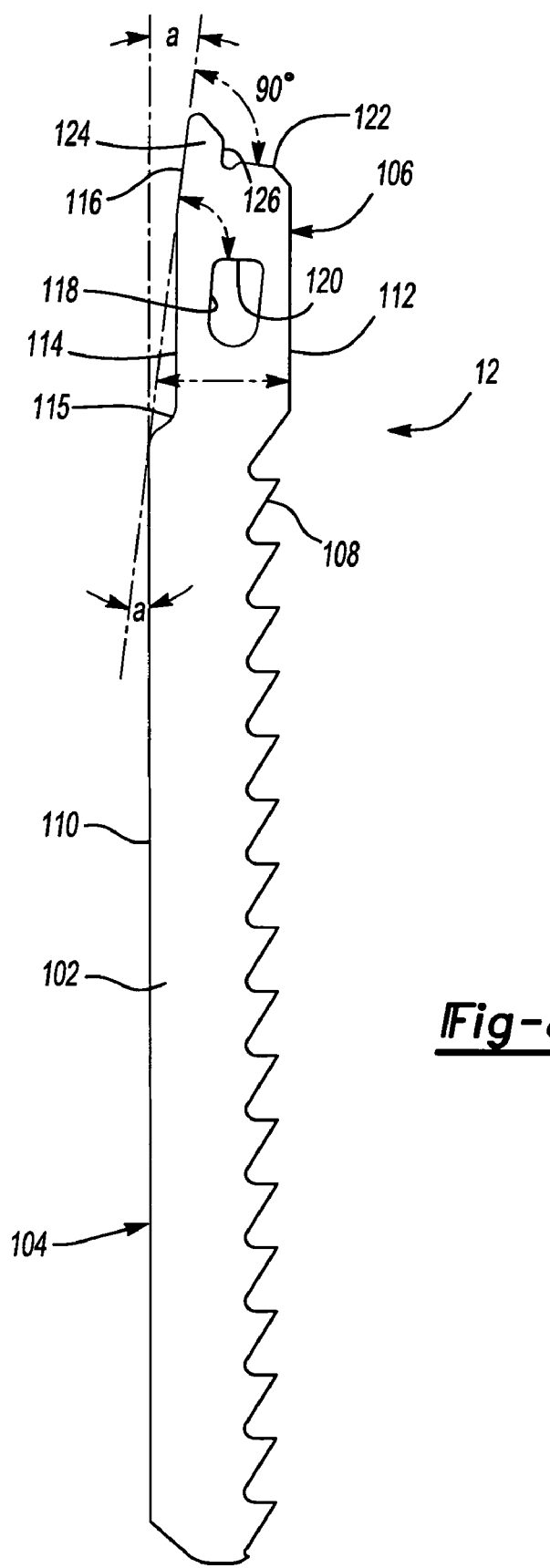
FIG. 8 is a plan view of the canted saw blade.

Referring to FIGS. 7 and 8, the features of the blade 12 will now be described. As shown specifically in FIG. 8, the blade 12 includes a body 102 of a flat strip of sheet material having a cutting portion 104 and a shank portion 106. The cutting portion 104 includes a cutting edge 108 and a back edge 110 on an opposite side of the cutting edge 108. The shank portion 106 includes a first edge 112 extending from cutting edge 108 of cutting portion 104 and a second edge 114 extending from back edge 110 of cutting portion 104. The second edge 114 is stepped at 115 so as to be laterally offset from back edge 110 of cutting portion 104. The second edge 114 of shank portion 106 also includes an angularly disposed edge section 116 lying in a plane angularly offset from cutting edge 108 of cutting portion 104. Shank portion 106 further includes an aperture 118 having a flat rear edge 120 which is disposed generally perpendicular to angularly disposed edge section 116 of second edge 114 of shank portion 104. A rear mounting edge 122 of the shank portion 106 is also generally perpendicular to edge section 116 of second edge 114. A tail section 124 extends from the shank portion 106 adjacent to the rear mounting edge 122.

Referring now to FIGS. 2 and 3, the operation of the retaining mechanism 20 will now be described using saw blade 12. To install blade 12 in the retaining mechanism 20, the blade 12 is inserted through channel 52 against the clamp end 24 of rocker arm 14 until the rear mounting edge 122 of the blade 12 abuts an angled contact surface 78 of stop 72. Tail section 124 of blade 12 extends between stop 72 and the first side wall 40 to provide the blade 12 with additional stability. Side surface 74 of stop 72 provides a bias against a side surface 126 of tail section 124 of blade 12. Once the blade is fully inserted, spring 32 biases the contoured contact surface 82 of the clamp end 24 against the flat rear edge 120 of the aperture 118 of the blade 12 which influences rear mounting edge 122 against angled contact surface 78 of stop 72 thereby securing the blade 12 to the retaining mechanism 20. Contoured contact surface 82 of clamp end 24 interfaces with the flat rear edge 120 of the aperture 118 thus providing a secure contact therewith. Accordingly, the contoured contact surface 82 of clamp end 24, the angled contact surface 78 and side surface 74 of stop 72 counter the forces created during culling or other operations. To remove the blade, the push button 8 is pressed against the lever end 26 of rocker arm 18 to disengage the clamp end 24 from the flat rear edge 120 of the aperture 86. Saw 10 prevents the user from turning on the unit while push button 8 is depressed. Similarly, push button 8 will not depress while saw 10 is in operation.

Referencing FIGS. 2, 4 and 5, the installation of second blade 12' (which has a greater thickness A' than thickness A of the first blade) is the same as described for the first blade 12. The geometry of the angled contact surface 78 of stop 72 and the contoured contact surface 82 of rocker arm 18 is such that blades having different thicknesses may be securely retained. Explained further, blade 12 having a thickness "A" and an aperture 118 a distance "B" from the rear mounting edge 112 of the blade 12 is located securely between the contoured contact surface 82 of the clamp end 24 and the angled stop contact surface 78 at contact points 88, 90 respectively. Likewise, blade 12' having a greater thickness, "A'" and a smaller distance "B'" from the mounting edge 76 of the saw. As such, blade 12' may be securely retained in the clamp device 20, and has contact points 92, 94 located a distance higher on the respective clamp and stop contact surfaces 82, 78 respectively. Accordingly, the geometry of the clamp contact surface 82 and the angled stop contact surface 78 cooperate to provide a versatile configuration that allows a variety of blades having a variety of thicknesses to be securely located at various contact points therebetween.

Turning now to FIGS. 6, 7 and 8, the retaining mechanism 20 of the present invention is operable to securely retain blade 12 which incorporates an integrated cant angle "a" (illustrated best in FIG. 8), as well as a blade 28 having no cant angle (FIG. 6). An important feature of canted blade 12 is that it includes a step 115 incorporated in the shank of the blade as well as an angled tail section 124. The step 115 and angled tail section 124 of the blade shank design allows for a canted blade to be formed using standard manufacturing methods and using raw-material strips having the same widths "W" that apply to blades having no cant angle (as illustrated in FIGS. 6 and 8). As such, a canted blade can be provided for no additional cost compared to the zero canted blades. Explained further, edges 60, 62 of non-canted blade 28 are separated an equivalent distance (designated "W" on FIG. 6) as parallel edges 112, 114 of canted blade 12 (designated "W" on FIG. 8). Accordingly, canted blade 12 with step 115 and angled tail section 124 can be stamped from a material strip no wider than used for blade 28. The aperture 118 of the blade 12 is angularly oriented such that the flat rear mounting edge 120 of the aperture 118 is perpendicular to the edge section 116 of second edge 114 of shank portion 106. As a result of this configuration, the flat rear edge 120 the aperture 118 is also oriented perpendicular to the side walls 40, 42.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saw blade comprising:
a body adapted for reciprocating engagement with a tool, said body including a cutting portion and a shank portion along a longitudinal axis thereof, said cutting portion having a cutting edge on a first side and a back edge on a second side opposite said first side, said shank portion having a first edge generally extending from said cutting edge and being laterally offset outwardly relative to said cutting edge, a second edge generally extending from said back edge, and a rear mounting edge generally connecting said first and second edges, said first edge extending substantially linearly from said cutting edge to said rear mounting edge, a first portion of said second edge proximate said back edge, said first portion being substantially parallel to said back edge and laterally offset from said back edge such that said first portion is positioned inward of said back edge toward said shank first edge, a stepped portion formed between said first portion and said back edge, a second portion of said second edge extending inwardly from said first portion and being angled with respect to said first portion to define an angularly disposed edge section proximate said rear mounting edge, said second portion extending substantially along said longitudinal axis and disposed at an angle relative to said first portion toward a line collinear with said shank first edge, and said angularly disposed edge section generally defining a reciprocating axis of said saw blade.

2. The saw blade of claim 1, wherein said shank portion includes an aperture therethrough.

3. The saw blade of claim 2, wherein said aperture includes a flat edge proximate said rear mounting edge.

4. The saw blade of claim 3, wherein said flat edge is generally perpendicular to said angularly disposed edge section.

5. The saw blade of claim 1, wherein said angle is an acute angle.

6. The saw blade of claim 5, wherein said angle is between 2 and 6 degrees.

7. The saw blade of claim 1, wherein said rear mounting edge is generally perpendicular to said angularly disposed edge section.

8. A saw blade and clamping system comprising:
a support structure including a pair of lateral walls and a base portion extending between said lateral walls, a majority of each of said lateral walls being generally parallel to one another; and
a saw blade having a body adapted for reciprocating engagement with said support structure, said body including a cutting portion and a shank portion along a longitudinal axis thereof, said cutting portion having a cutting edge on a first side and a back edge on a second side opposite said first side, said shank portion having a first edge generally extending from said cutting edge and being laterally offset outwardly relative to said cutting edge, a second edge generally extending from said back edge, and a rear mounting edge generally connecting said first and second edges, said first edge extending substantially linearly from said cutting edge to said rear mounting edge, said second edge proximate said back edge, a first portion of said second edge being substantially parallel to said back edge and laterally offset from said back edge such that said first portion of said second edge is positioned inward of said back edge toward said shank first edge, a stepped portion formed between said first portion of said second edge and said back edge, a second portion of said second edge extending inwardly from said first portion and being angled with respect to said first portion to define an angularly disposed edge section proximate said rear mounting edge, said second portion extending substantially along said longitudinal axis and disposed at an angle relative to said first portion toward a line collinear with said shank first edge, and said angularly disposed edge section adapted to engage one of said lateral walls of said support structure, said angularly disposed edge section generally defining a reciprocating axis of said saw blade.

9. The system of claim 8, wherein said base portion includes a stop thereon and said rear mounting edge of said saw blade is disposed against said stop.

10. The system of claim 8, wherein said shank portion includes an aperture therethrough.

11. The system of claim 10, wherein said aperture includes a flat edge proximate said rear mounting edge.

12. The system of claim 11, wherein said flat edge is generally perpendicular to said angularly disposed edge section.

13. The system of claim 8, wherein said angle is an acute angle.

14. The system of claim 13, wherein said angle is between 2 and 6 degrees.

15. A saw blade comprising:
a body adapted for reciprocating engagement with a tool, said body including a cutting portion and a shank portion along a longitudinal axis thereof, said cutting portion having a cutting edge on a first side and a back edge on a second side opposite said first side, said shank portion including an aperture therethrough and having a first edge generally extending from said cutting edge, a second edge generally extending from said back edge, and a rear mounting edge generally connecting said first and second edges, a first portion of said second edge proximate said back edge, said first portion being substantially parallel to said back edge and laterally offset from said back edge such that said first portion is positioned inward of said back edge toward said shank first edge, a stepped portion formed between said first portion and said back edge, a second portion of said second edge extending inwardly from said first portion and being angled with respect to said first portion to define an angularly disposed edge section proximate said rear mounting edge, said second portion extending substantially along said longitudinal axis and disposed at an angle relative to said first portion toward a line collinear with said shank first edge, said angularly disposed edge section generally defining a reciprocating axis of said saw blade, and said aperture in said shank portion including a generally flat edge proximate said rear mounting edge, said flat edge being generally perpendicular to said angularly disposed edge section.

* * * * *